United States Patent
Bazsa et al.

(10) Patent No.: US 6,294,792 B1
(45) Date of Patent: Sep. 25, 2001

(54) UV DOSIMETER

(75) Inventors: György Bazsa; Mihály Beck; Zsolt Fazekas, all of Debrecen; Vincze Zsuzsanna Györgyné Fleischinger, Vác; Irén Horkay; Zoltán Nagy, both of Debrecen; Attila Nemes, Biharnagybajom; István Országh, Debrecen; Miklós Rácz, Budapest; Tibor Szalay, Debrecen, all of (HU)

(73) Assignee: Kossuth Lajos Tudomanyegyetem (HU)

( * ) Notice: Subject to any disclaimer, the term of this patent is extended or adjusted under 35 U.S.C. 154(b) by 0 days.

(21) Appl. No.: 09/303,425

(22) Filed: May 3, 1999

(30) Foreign Application Priority Data

May 13, 1998 (HU) .................................................. 9801078

(51) Int. Cl.[7] ........................................................ G01J 1/50
(52) U.S. Cl. ...................................... 250/474.1; 250/482.1
(58) Field of Search ............................... 250/474.1, 482.1

(56) References Cited

U.S. PATENT DOCUMENTS 5,028,792 * 7/1991 Mullis ................................ 250/474.1
6,015,621 * 1/2000 Lischewski et al. ............... 250/474.1

* cited by examiner

*Primary Examiner*—Constantine Hannaher
*Assistant Examiner*—Andrew Israel
(74) *Attorney, Agent, or Firm*—Keil & Weinkauf

(57) ABSTRACT

The subject of the invention is a UV dosimeter suitable for visual evaluation, which is consisted of a light-sensitive layer on a carrier and a cover layer. The thickness of the light-sensitive layer is 10–40 μm, the concentration is 95–105 $g/dm^3$ and calculated to the volume of the suspension it contains in a water bloated high molecular weight polymer amenable to hardening 0,004–0,2 $mole/dm^3$ of argentic (I) oxalate, 0,0014–0,07 $mole/dm^3$ of water soluble multivalent metallic oxalate and 0,00044–0,006 $mole/dm^3$ of complexing additive. The light-sensitive layer is fitted with a cover layer, which is light-transmitting in the UVB range excluding the humidity of the air.

10 Claims, No Drawings

UV DOSIMETER

The subject of the invention is a UV dosimeter suitable for visual evaluation and a procedure for its production.

About 5% of the sunshine reaching the earth-surface is ultraviolet (UV) radiation (200–400 nm). The UV radiation has both favourable and unfavourable, moreover harmful effect on the human body. Harmfull consequences are detectable either immediately after the radiation, or even some decades later. Since the biological effect strongly depends on the wavelength, thus the whole UV spectrum is usually divided into three regions, such as UVA, UVB and UVC spectra. The UVB radiation (290–320 nm) is responsible for the major biological effects and also for the harmful consequences.

As a biological effect on the human body the UV light has an influence on the skin, eyes and the immune system. Among the early acute damages there are the dermatitis, conjunctivitis, keratitis, the delayed damages include the early skin ageing, skin cancer, exacerbation of skin diseases, cataract formation, weakening of the body's prophylactic mechanism, susceptibility to skin infection and skin cancer.

The simplest way of the protection or the prevention against the harmful consequence of the UV irradiation is to measure the intensity of the irradiation and to expose the skin to the solar radiation (UV radiation) only as much extent as the exposure dose is even harmless.

The chemical actinometers being appropriate for personal use are the simplest UV dosimeters. Their operation is based upon the analysis of the effect of the chemical reaction (or reactions) initiated by a light irradiation, which need the quantitative analysis of the starting substance(s) or the product(s) (H. J. Khun, S. E. Braslavsky, R. Schmidt: Chemical Actinometry, Pure and Appl. Chem., Vol.61, No2, pp 187–210, 1989). Since generally the evaluation is done by a spectrophotometer, these dosimeters are not convenient for a simple or multitudinous application.

For a self-checking device the most suitable dosimeter is a simple and easily utilizable dosimeter, which is implemented on a visually evaluable solid carrier, which is disposable and does not pollute the environment.

The device suitable for the above purposes should fulfil the following requirements:
- the light-sensitive layer should be sensitive enough in the UVB range of the sunlight,
- the colour change (density) should be proportional to the dose of the light irradiated the photosensitive layer,
- the density should be visually evaluable within 1 minute and 1–2 hours interval, i.e. the "density curve" being characteristic of the system should have a linear section with a specific angular coefficient,
- the photoinduced reaction should be irreversible id est non-reversible, i.e. the quantity of the density being proportional to the quantity of the irradiated light should be constant both in the function of time and in dark even if later it is exposed by a light with longer wavelength, then the detecting light wavelength.

Several reactions are known, which are effected by light and which result in a visually detectable colour change. However for some reasons these reactions are not convenient for the analysis of the doses of the UVB radiation. The reasons are, that first of all those are sensitive also in the visible light range and consequently those are not selective in the UVB range, furthermore the reaction is reversible and consequently if it is left in dark the irradiated layer is lightened and the evaluation become impossible.

Among the ultraviolet dosimeters being suitable for personal use the polisulphon film dosimeters are considered as the most updated devices. [Davis, A., Deane, G. H. W. and Diffey, B. L.: Possible dosimeter . . . , Nature 261 169–170 (1976)]. The polisulphon film dosimeter is carrier coated by a polisulphon layer with 40 $\mu$m thickness, which is applicable in the range of 250–330 nm. Its disadvantage is, that the application is awkwardish difficult, since its evaluation can be carried out by means of an instrument.

In accordance to the above a visually evaluable UV dosimeter indicator is presented by the Hungarian patent no. 208 865, which light-sensitive layer consists of mercuric (I), mercuric (II) and argentic-oxalate. The bulky application of the indicator is not convenient, since by the application of the disposable light-sensitive layer the environment could be polluted with mercuric salts.

Our aim was to develop a UV dosimeter, which both corresponds to the above requirements and even does not pollute the environment. According to the literature one of the best known chemical actinometers is the sulphuric acid solution of the potassium tris-oxalic ferric (III) complex (H. J. Khun at al: Pure & Appl. Chem. 61, 187 (1989). The tris-oxalic ferric (III) anion is degraded in a fotoreduction procedure as it is labelled in the gross reaction equation no. 1:

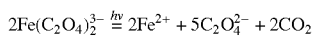

$$2Fe(C_2O_4)_2^{3-} \xrightarrow{h\nu} 2Fe^{2+} + 5C_2O_4^{2-} + 2CO_2$$

By reacting ferro (II) ions obtained in the photoreduction process with an appropriate complex forming agent e.g. orthophenan-throline (further on: phen) as it is labelled in the equation no. 2, a characteristic ruddy trisphenanthroline ferro (II) complex is formed which molar absorbance is considerably high ($1.1 \times 10^4$ $M^{-1}$ $cm^{-1}$), consequently it is now convenient for the detection of the photoreduction process.

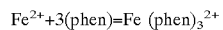

$$Fe^{2+} + 3(phen) = Fe(phen)_3^{2+}$$

This actinometer operates in the wavelength range of 250–580 nm (A. J. Gordon, R. A. Ford: The Chemist's Companion, A Handbook of Practical Data, Techniques and References; John Wiley Sons, New York p 362). Since this range is too wide and overreach even into the visible light range, this device is not convenient for the selective measurement of the UV radiation doses.

A further problem is, that since the tris-oxalic ferric (III) salt is highly soluble in water, the diffusion rate in the carrier layer of the dosimeter is considerably high, consequently after the irradiation the system does not remain constant and the obtained colour change is not evaluable.

The invention is based on the recognition, that the above mentioned problems can be discarded, when the light-sensitive layer contains not only the ferric (III) oxalate complex alone but as a light-sensitive system it contains the argentic (I) oxalate as well, moreover the ferro (II) oxalate complex is produced within the light-sensitive system. In this case the ferric (III) ions are chemisorbed on the surface of the argentic (I) oxalate being precipitated in solid form and a multinuclear argentic (I) oxalate-ferric (III) oxalate complexes are formed, which adequately stabilise the system in order to obtain as a result of the irradiation a constant and evaluable coloration (browning).

In the above light-sensitive system and in the presence of argentic (I) oxalate the $Fe^{2+}$ ions being formed in the first stage of the photoreduction are reoxidized by the argentic (I) ions to $Fe^{3+}$ ions (3). According as the quantity of the efficient photons reaching the emulsion is high enough, then the previous nearly white layer irreversibly turns to brown. The browning becomes the degree of its generating light dosage.

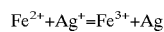

$$Fe^{2+} + Ag^+ = Fe^{3+} + Ag$$

The subject of the invention is a UV dosimeter, which consists of a layer containing the above light sensitive system being applied on an appropriate carrier and an upper layer.

The concentration of the light-sensitive layer forming suspension is 95–105 g/dm$^3$ and calculated to the volume of the suspension it contains in a water bloated high molecular weight polymer amenable to hardening preferably in gelatine 0.004 to 0.2 mole/dm$^3$ of argentic (I) salt, 0.0014 to 0.07 mole/dm$^3$ of water soluble multivalent metallic salt, free dicarboxylic acid in maximum equivalent quantity relative to the argentic (I) ions and 0.00044 to 0.006 mole/dm$^3$ of complexing additive.

Beside the ferric (III) ions e.g. cobaltic (III) and nickelic (III) ions are also suitable for the preparation of the light sensitive system. As a ferric (III) ion salt preferably ferric (III) sulphate or ammonium ferric (III) sulphate is used.

As a dicarboxylic acid e.g. oxalic acid, malonic acid, glutaric acid or succinic acid it is preferable to use oxalic acid.

According to one of the favourable implementations of the invention the light-sensitive layer is a congealed suspension by the layer thickness of 200 cm$^3$×m$^{-2}$ and in 100 g/dm$^3$ water bloated inert gelatine relative to the volume of the suspension it contains 0.04 mole/dm$^3$ of argentic (I) oxalate, 0.014 mole/dm$^3$ of ferric (III) oxalate, 0.0011 mole/dm$^3$ of orthophenanthroline and 1 equivalent free oxalic acid relative to the quantity of the argentic (I) ions.

The preparation of the light sensitive layer containing suspension is carried out by mixing at first the aqueous solutions of the argentic salt preferably the argentic (II) nitrate and the oxalic acid into a water bloated and an amenable to hardening polymer preferably into gelatine and then the aqueous solution of the water soluble ferric (III) salt, e.g. ferric (III) sulphate or ammonium ferric (III) sulphate is added into the obtained suspension, and finally with the application of the aqueous solution of the polymer the concentration of the gelling agent is adjusted to 100 g/dm$^3$. In a desired case the complexing additive is fed into the latter solution. If it is necessary the pH of the suspension is adjusted by sulfuric acid or nitric acid to the value of 1.8 to 2.3 preferably to 2.0. The obtained suspension is laid out in a thickness of 100 to 500 cm$^3$×m$^{-2}$ preferably 200 cm$^3$×m$^{-2}$ on a carrier by a known method e.g. by photographic pouring.

The thickness of the frozen light-sensitive layer is 190±10 $\mu$m, and the thickness of the air-dried layer is 20–22 $\mu$m.

Preferably the carrier is a barite board paper, however it could be any other suitable layer, e.g. plastic.

The spectral and the relative sensitivity of the system—(3) reaction rate—can be influenced by the changing of the composition of the suspension (e.g. the ratio of the ferric (III) oxalate and argentic oxalate) and the complexing additives. As a complexing additive beside the orthophenanthroline organic bases e.g. ethylene amine or $\alpha,\alpha'$-dipyridil are also applicable.

Taking into account, that in aqueous phase the ferric (III) sulphate hydrolyses very easily, in order to drive back the undesirable hydrolysis it is recommended to solve it in the diluted solution of the acids (sulphuric acid, nitric acid) used widely for this purpose.

For the better detection of the coloration (browning) obtained as a result of the irradiation a small quantity of hydrogen peroxide (3–4 cm$^3$ of 30% solution/dm$^3$ suspension) is recommended to be fed, which results is, that the unexposed light-sensitive layer becomes nearly colourless. Hydrogen peroxide is added into the suspension consecutively after the feeding of the ferric (III) sulphate.

The light-sensitive layer by the above composition is able for the visual detection of the irradiation lasting in the practice for several minutes, however it is not stable enough for the operation as a dosimeter with a constant light-sensing ability in time. Namely as a result of the auxiliary reactions in the light-sensitive layer—e.g. gradual changing of the pH due to the penetration of the air humidity into the light-sensitive layer—the colour of the layer gradually changes and consequently the evaluation becomes uncertain.

It was found, that the above discussed problem can be eliminated by coating the light-sensitive layer with an appropriate composition of the cover layer for excluding the humidity of the air.

In order to obtain an efficient cover layer, it should be strength enough, air humidity can not be transmitted, degree of its acidity should be high enough in order to maintain the pH of the light-sensitive layer below at a constant value, and its light-transmitting capacity should be adequate, namely it should not have absorption in the UVB range.

According to our experiments the demands above are fulfilled by an inert gelatine layer, which is developed by the application of polyvinyl alcohol and an appropriate tenside, furthermore the adequately fast solidification is forwarded by alunite emulsion tanning agent. Degree of the acidity of the cover layer is adjusted by nitric acid to the pH range of 1.8 to 2.3.

From among the tensides used in the photochemical industry for the above purpose, the most appropriate ones do not absorb the light in the UVB range.

The concentration of the cover layer is 14–17 g/dm$^3$ and calculated to the volume of the suspension in a water bloated inert gelatine it contains 1.7 to 3.0 g/dm$^3$ of polyvinyl alcohol, 2–10 g/dm$^3$ of emulsion tanning agent and 60–80 g/dm$^3$ of a tenside transmitting the light in the UVB range.

According to a favourable composition the concentration of cover layer is 14.3 g/dm$^3$ and calculated to the volume of the suspension in a water bloated inert gelatine it contains 1.91 g/dm$^3$ of polyvinyl alcohol, 4.77 g/dm$^3$ of alunite and 72 g/dm$^3$ of ORWO-1292 tenside.

According to the preparation of the cover layer in 14–17 g/dm$^3$ of water bloated inert gelatine calculated to the volume of the suspension 1.7 to 3.0 g/dm$^3$ of polyvinyl alcohol, 2–10 g/dm$^3$ of aqueous solution of emulsion tanning agent and 60–80 g/dm$^3$ of a tenside transmitting the light in the UVB range are homogenized and the pH of the suspension is adjusted by nitric acid to the value of 1.8 to 2.3.

The cover layer is taken up onto the light-sensitive layer in a separate procedure by the known photographic pouring method laying out 100–200 cm$^3$ cover suspension onto 1 m$^2$ surface. The thickness of the wettish cover layer is 150±10 $\mu$m, and the thickness of the dry layer is 3.0 to 3.6 $\mu$m.

The light-sensitive layer of the UV dosimeter equipped with a cover layer is stable in the function of time and able to compare in a safety way the time-dependent density (browning) being obtained as a result of the exposure with a calibrated density gradation (chock) being manufactured by printing technics.

The sunlight sensitivity of the human skin first of all is determined by the type of the skin. According to the skin-test to sunlight the humans are classified into 6 groups. Types I and II fairish or white-skinned persons belonging to the extremely sensitive to UV light groups are very sensible to dermatosis caused by the sunlight. During sun-bathing they often sunburn, however hardly or never brown. Persons belonging to the type III are less sensible, restrained sunburn, gradually and uniformly brown, while the skin of the persons belonging to the type IV sunburn in a minimal extent, they brown finely and extremely, and finally the sensitivity of the persons belonging to the type V is very low, they rarely sunburn, easily turn to be dusky. (Type VI in not sensible to the UV radiation.)

Thus the sun-bathing time based on the density gradation is given in accordance with the above skin types, consequently the density scale is evaluable in the function of the types of the human.

Our invention is detailed in the examples below without limiting our claims to them Preparation of the Light-sensitive Layer

EXAMPLE 1

1. 5 g gelatine is steeped from 30 min in the mixture of 76 $cm^3$ water and 1 $cm^3$ 0.5 M sulfuric acid.

2. 1.7 g (0.01 mole) argentic nitrate is dissolved in 20 $cm^3$ 0.01 M nitric acid.

3. 0.6 g (0.02 mole) oxalic acid dihydrate is dissolved in 20 $cm^3$ water.

4. 3.5 g (0.00875 mole) ferric (III) sulphate is dissolved in 5 $cm^3$ 1 M sulfuric acid containing 50 $cm^3$ water, and after the dissolution it is adjusted to 100 $cm^3$.

5. 20 g gelatine is steeped for 30 min in the mixture of 120 $cm^3$ water and 1.5 $cm^3$ 65% sulfuric acid.

The 1st solution is heated up to 45° C., and under continuous stirring the 2nd solution is added into it, then beside continuous and intensive stirring the 3rd solution is dropped into it, then 20 $cm^3$ of the 4th solution and 1 $cm^3$ of 30% hydrogen peroxide are poured into it, and finally within 1 minute the 5th gelatine is added into it. After 15–30 min stirring the homogene mixture is cooled to 35° C. and by photographic pouring it is taken up the barite board in the layer thickness of 200 $cm^3 \cdot m^{-2}$.

EXAMPLE 2

Procedure according to example 1 with the difference that before the adding of the gelatine 0.2 g (0.0011 mole) of orthophenanthroline is fed into the solution 5.

EXAMPLE 3

Procedure according to example 2 with the difference that instead of the ferric (III) sulphate 4.25 g Mohr's salt is measured into the solution 4.

EXAMPLE 4

Procedure according to example 1 with the difference that instead of the ferric (III) sulphate 8.5 g (12 mole) of crystal water containing Mohr's salt is measured into the solution 4.

EXAMPLE 5

Procedure according to the example 4 with the difference that furthermore 0.2 g orthophenanthroline is added into the solution 4.

Example 6

Procedure according to the example 1 with the difference that instead of the ferric (III) sulphate 2,15 g Mohr's salt is measured into the solution 4.

Preparation of the Cover Layer

EXAMPLE 7

Inert gelatine of 3 g is added into 180 $cm^3$ of distilled water, it is bloated for 30 min, then is dissolved at 60–63° C. for 15 min, then cooled back to 35° C. Thereafter the aqueous solutions of the following four components according to the listed order under constant stirring are added into the gelatine solution:

1. 20 $cm^3$ of polyvinyl alcohol (viscosity of the 4% aqueous solution at 20° C. is 25 cPoise),
2. 2 $cm^3$ of 65% nitric acid,
3. 15 $cm^3$ of ORWO-1292 tenside,
4. 10 $cm^3$ of 10% alunite.

By photographic pouring the obtained suspension is taken up the prepared light-sensitive layer in the quantity of 0.145 kg relative to 1 $m^2$ layer.

What is claimed is:

1. A UV dosimeter suitable for visual evaluation, which has a light-sensitive layer on a carrier layer and a cover layer excluding the humidity of the air and transmitting the light being in the UVB range, furthermore the concentration of the light-sensitive layer is 95–105 $g/dm^3$ and calculated to the volume of the suspension it contains a water bloated high molecular weight polymer amenable to hardening 0.004 to 0.2 $mole/dm^3$ of argentic (I) oxalate, 0.0014 to 0.07 $mole/dm^3$ of water soluble multivalent metallic oxalate and 0.00044 to 0.006 $mole/dm^3$ of complexing additive.

2. The UV dosimeter defined in claim 1, wherein the thickness of the light-sensitive layer is 10–40 μm.

3. The UV dosimeter defined in claim 1, wherein the light-sensitive layer contains 1–2 equivalent free dicarboxylic acid preferably 1 equivalent oxalic acid relative to the quantity of the argentic (I) ions.

4. The UV dosimeter defined in claim 1, wherein the concentration of the cover layer is 14–17 $g/dm^3$ and calculated to the volume of the suspension in a water bloated inert gelatine it contains 1.7 to 3.0 $g/dm^3$ of polyvinyl alcohol, 2–10 $g/dm^3$ of emulsion tanning agent and 60–80 $g/dm^3$ of a tenside transmitting the light in the UVB range.

5. The UV dosimeter defined in claim 1, wherein the thickness of the cover layer is 3.0 to 3.6 μm.

6. The UV dosimeter defined in claim 1, which has a light sensitive layer by the thickness of 20–22 μm on a barite board paper and in 100 $g/dm^3$ water bloated inert gelatine relative to the volume of the suspension it contains 0.04 $mole/dm^3$ of argentic (I) oxalate, 0.014 $mole/dm^3$ of ferric (III) oxalate, 0.0011 $mole/dm^3$ of orthophenanthroline and 1 equivalent free oxalic acid relative to the quantity of the argentic (I) ions, furthermore the thickness of the cover layer is 3.0 to 3.6 μm, the concentration is 14.3 $g/dm^3$ and calculated to the volume of the suspension in a water bloated inert gelatine it contains 1.91 $g/dm^3$ of polyvinyl alcohol, 4.77 $g/dm^3$ of alunite and 72 $g/dm^3$ of ORWO-1292 tenside.

7. A procedure for the production of a UV dosimeter suitable for visual evaluation, wherein the light sensitive layer claimed in claim 1 is taken up by photographic pouring on the carrier.

8. The UV dosimeter defined in claim 1, wherein the metal in the water soluble multivalent metallic oxalate is Fe(III), Co(III) or Ni(III).

9. The UV dosimeter defined in claim 1, wherein the complexing agent is orthophenanthroline, ethyleneamine or α,α'-dipyridil.

10. The UV dosimeter defined in claim 1, wherein the docarboxylic acid is oxalic acid, malonic acid, glutaric acid or succinic acid.

* * * * *